Sept. 5, 1939.  J. LANG  2,172,165
RESILIENT WHEEL
Filed Oct. 28, 1938
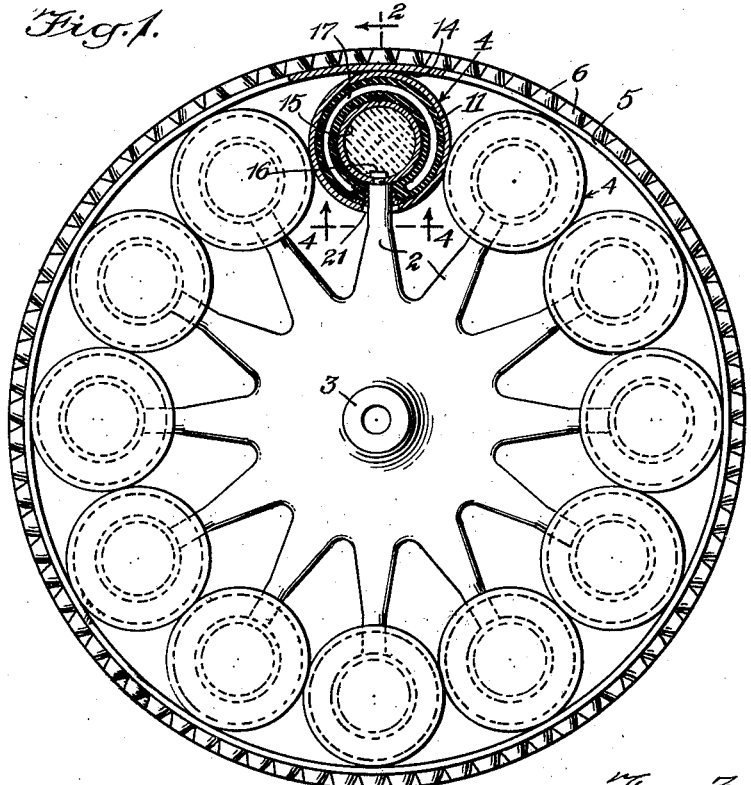
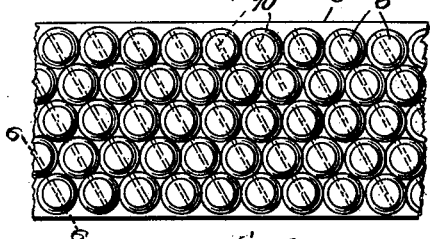
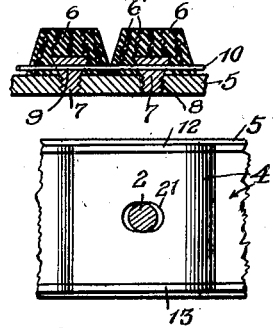
WITNESSES
INVENTOR
John Lang
BY
Munn, Anderson & Liddy
ATTORNEYS Patented Sept. 5, 1939

2,172,165

UNITED STATES PATENT OFFICE 2,172,165

RESILIENT WHEEL

John Lang, New York, N. Y.

Application October 28, 1938, Serial No. 237,407

3 Claims. (Cl. 152—43)

This invention relates to resilient wheels, and has for an object to provide an improved construction wherein a strong wheel may be produced which will continually function as a resilient wheel without the use of pneumatic supporting means.

Another object of the invention is to provide an improved resilient wheel wherein resilient members are arranged at the outer ends of the respective spokes of the wheel for resiliently supporting an outer rim during the functioning of the wheel.

A further object of the invention is to provide a resilient wheel provided with spokes and an outer rim supplied with cushion members on the outer surface and means between the outer rim and each spoke for presenting a resilient support for the rim and adapted to permit a slight independent rotary motion between the rim and the spokes but preventing all lateral motion.

In the accompanying drawing—

Fig. 1 is a side view of a resilient wheel disclosing an embodiment of the invention, a portion of the wheel being shown in section for better illustrating the construction;

Fig. 2 is a sectional view through Fig. 1 approximately on the line 2—2;

Fig. 3 is an enlarged sectional view similar to the upper part of Fig. 2;

Fig. 4 is a fragmentary sectional view through Fig. 1 approximately on the line 4—4;

Fig. 5 is a fragmentary top plan view of the wheel shown in Fig. 1, said figure illustrating an embodiment of the cushion members and the holding wires or rods therefor;

Fig. 6 is an enlarged detail fragmentary sectional view through Fig. 5 approximately on the line 6—6.

Referring to the accompanying drawing by numerals, 1 indicates the body of the wheel, which is provided with a number of spokes 2 and a hub structure 3 adapted to receive an axle of any desired kind. Each of the spokes 2 is provided with what may be termed a resilient connecting member 4. A metal rim 5 is mounted exteriorly of all the members 4 and on the outer surface of the rim 5 there are rubber cushion members 6, which are shown more in detail in Figs. 5 and 6. It will be seen that each cushion member 6 is provided with a metal member 7 having a threaded end 8 adapted to be screwed into a suitable aperture in the rim 5. Each of the members 7 is provided with an aperture 9 so that a small rod or wire 10 may be extended through several of the cushion members 6 to hold the threaded member 7 against unscrewing. As indicated in Fig. 5, each rod or wire 10 extends through five cushion members 6 and extends at an angle rather than transversely of the rim 5. The resilient connecting members 4 are all identical and, therefore, a description of one will apply to all.

As indicated in the accompanying drawing, each of these resilient members is provided with a tubular member 11 having metal caps 12 and 13 at their respective ends. These caps are screwed into the tubular member 11, as shown in Fig. 3. Also it will be understood that the various tubular members 11 are welded or otherwise secured at 14 to the rim 5 and also welded or otherwise secured to each other at their points of contact. This arrangement provides a metal housing and interiorly of this housing there is provided an inner tubular metal member 15, filled with a pastry lubricant 22. The inner tubular member 15 has its ends closed by end plates or caps 12 and 13 and which is secured to the spoke 2 by a suitable screw 16, as shown in Figs. 1 and 3. The connection between the tubular member 15 and the spoke 2 is rigid.

Between the tubular member 15 and the tubular casing 11 there is provided a cushion 17 formed of rubber and fabric so as to present an air space 18. This cushion is provided with an opening 19 in which a metal thimble 20 extends and through this thimble the end of spoke 2 projects, as shown particularly in Fig. 3. By reason of this construction there is a certain amount of resilient movement between the tubular member 15 and the tubular member or casing 11 as the wheel functions. The opening 21 in the tubular member 11 is elongated, as shown in Fig. 4, in order to allow a certain amount of circumferential movement of the spokes 2 in respect to the tubular members 11.

As the various tubular members are rigidly secured together the above-mentioned circumferential movement is desired in order to permit the cushion 17 to function properly. For instance, if there should be a downward pressure at the center of the rim 5, as shown in Fig. 1, the resilient member 4 associated therewith would move directly downwardly and the other members 4 would move slightly in respect to the spokes 2 until the resistance becomes so great that the movement would be stopped. The reverse action, of course, is true, namely, if the weight applied to the hub structure 3 should suddenly be increased there would be a downward movement of the body 1 and spokes 2 until the resistance of the cushion members and other parts would stop the movement.

As the wheel is used the cushion members 6 will first yield or be compressed somewhat and, at the same time, the cushion 7 will resiliently yield so as to provide a desired cushioning effect for the entire wheel.

The cushion members 6 are preferably made of resilient rubber impregnated with reinforced members 6', which may be canvas or a piece of wire or wire mesh, to provide a proper wearing structure. However, these members will yield and also the various cushion members 17 will yield and allow a resilient movement between the hub 3 and the other parts so as to cushion the load carried by the wheel.

As the wheel rotates it will be understood that the weight will be successively thrown on the various spokes 2 and cushions 17 in succession, so that as the wheel functions practically all the cushions 17 will be moved in and out and circumferentially at all times. This continuous cushioning or resilient action causes a desired resilient or cushioned support for the load being carried by the wheel. Use of the various cushion members, in addition to providing a cushioning effect, will provide a desired traction so that while the wheel may be used only as a traction wheel it may also be used as a propulsion or driving wheel without departing from the spirit of the invention.

I claim:

1. A resilient structure for a wheel having a body provided with a plurality of radiating spokes, and a metal rim, comprising a cushion member carried by each of said spokes at the outer end, each of said cushion members being formed with a metal housing having a single opening, the parts of said housing being connected rigidly together, each of said cushion members being formed with a tubular center open at both ends, means for rigidly securing said tubular center at its center to the ends of a spoke, a resilient member surrounding said tubular center and continually pressing against said spoke for preventing foreign matter entering said resilient member filling the space between said metal housing and said tubular center, and a lubricant positioned in said tubular center adapted to lubricate two of the walls of the housing, all of said cushion members being arranged interiorly of said rim and said metal housing being rigidly secured to the rim.

2. A resilient structure for a wheel having a body provided with a plurality of radiating spokes and a rim encircling said spokes but spaced therefrom, comprising a resilient structure arranged between the outer ends of said spokes and said rim, said resilient structure including a tubular member rigidly secured to the outer end of each of said spokes, a pasty lubricant filling said tubular member, a cushion member surrounding said tubular member having an aperture through which the spoke extends to the tubular member, said cushion member at said aperture pressing continually against said spoke to prevent water and other foreign matter entering, and a metal casing completely enclosing said cushion member provided with an elongated opening through which extends said spoke, said casing being rigidly secured together and to said rim.

3. A resilient structure for a wheel having a body provided with a metal rim having diagonal rows of threaded apertures, comprising a resilient cushion member for each of said threaded apertures in said rim, each of said resilient cushion members including a resilient head and a threaded stem screwed into one of the threaded apertures in the rim, each of said stems having an aperture extending therethrough, and a locking pin extending through all of the stems of each row of said cushion members.

JOHN LANG.